No. 704,547.  
W. R. KINNEAR.  
EXPANSIBLE BOLT.  
(Application filed Jan. 10, 1902.)  
Patented July 15, 1902.

(No Model.)

WITNESSES.  
Benj. Finckel  
A. J. Finckel

INVENTOR.  
William Raymond Kinnear  
BY  
Finckel & Finckel  
his ATTORNEYS

UNITED STATES PATENT OFFICE.

WILLIAM RAYMOND KINNEAR, OF COLUMBUS, OHIO.

EXPANSIBLE BOLT.

SPECIFICATION forming part of Letters Patent No. 704,547, dated July 15, 1902.

Application filed January 10, 1902. Serial No. 89,155. (No model.)

*To all whom it may concern:*

Be it known that I, WILLIAM RAYMOND KINNEAR, a citizen of the United States, residing at Columbus, in the county of Franklin and State of Ohio, have invented certain new and useful Improvements in Expansible Bolts; and I do hereby declare the following to be a full, clear, and exact description of the invention, such as will enable others skilled in the art to which it appertains to make and use the same.

It is frequently necessary to bolt heavy parts to brickwork, stonework, or woodwork. The permanent and strong engagement of the threads of a screw-bolt alone with the brick, stone, or wood cannot be relied upon.

The object of this invention, therefore, is to provide an improved simplified construction of so-called "expansible" bolt efficient for the purpose stated.

The invention resides in the construction hereinafter described and claimed.

Figure 1:
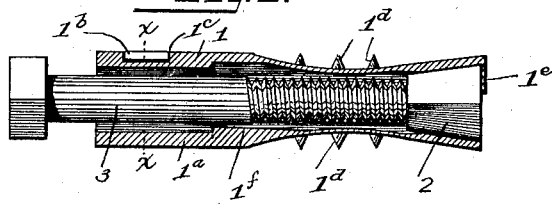
Figure 2:
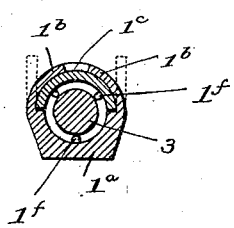
Figure 3:
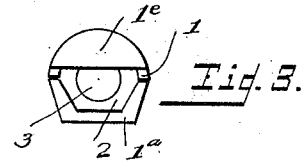
Figure 4:
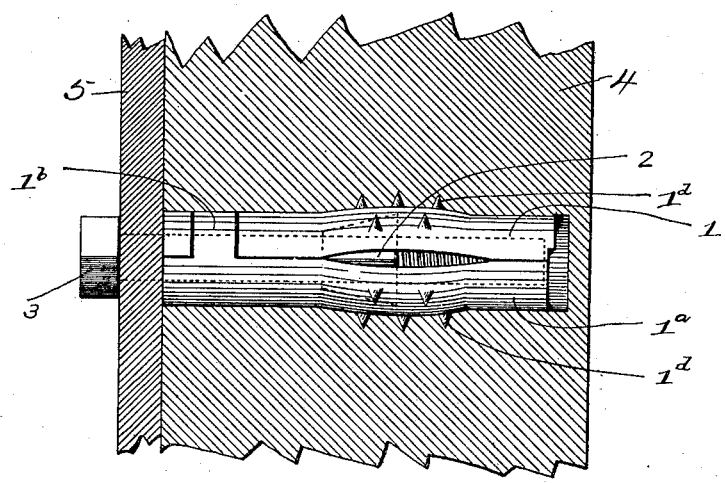

In the accompanying drawings, in which I have shown an embodiment of the invention, Figure 1 is a longitudinal sectional view of the expansible parts of the device, the bolt proper and nut contained therein being depicted in full lines. Fig. 2 is a transverse sectional view on the line $x$ $x$, Fig. 1. Fig. 3 is a view of the inner end of the device—that is, the right-hand end of Fig. 1. Fig. 4 illustrates the bolt in use.

The outer or expansible part of the device consists of a tube composed, as shown, of two semitubular and practically symmetric shells or parts 1 and $1^a$, matching together and held at one end by tongues $1^b$ on the part $1^a$, that are bent down (see Fig. 2) in a groove $1^c$ on the part 1. The outer surfaces of the shells are provided, preferably, with spurs $1^d$. That portion of the metal of the two half-shells bearing the spurs is made thin, so that it will be expanded, as hereinafter explained. Moreover, such portions are shown to be depressed below the end portions to permit the insertion of the device in the hole into which it is to be locked without interference of the spurs, the spurs being subsequently projected, as hereinafter shown, and the interior of the tube-like body tapers from the inner end toward the middle thereof and is provided with an internally-threaded wedging-nut 2, fitting when the parts 1 and $1^a$ are closed rather closely in the extreme outer end of said parts, so that when the wedge-nut is drawn outward by the bolt 3 the said parts 1 and $1^a$ are forced asunder, the thin metal yielding, as seen in Fig. 4. The inner end of the half-shell 1 is shown to be provided with a small inwardly-extending flange $1^e$ to prevent the nut from falling out. The tongues $1^b$ are preferably comparatively soft and flexible and are simply provided to hold the parts temporarily together. These tongues do not interfere materially with the expansion of the inner ends of the parts 1 and $1^a$ when the wedge-nut is drawn outward by the bolt 3. The tube-like shell can be made, if desired, slightly irregular or non-round toward its outer end, as seen in Figs. 2 and 3, to assist when the device is inserted in the hole prepared for it in preventing the shell from turning on its axis when the bolt is turned to draw the wedging-nut. The inner sides of the half-shells can be made with longitudinal ribs $1^f$ to hold the bolt and nut in the axial line of the device.

In practice a hole is first drilled or bored in the structure 4 to which a part 5 is to be bolted. The tube-like shell 1 $1^a$, containing the nut 2, is driven into such hole and the bolt then passed through the part 5 to be secured to the structure 4 and turned in the nut 2. Upon continued turning of the bolt the nut 2 is drawn outward, expanding the spurred portions of the shells 1 and $1^a$ into intimate connection with the surrounding material of the structure 4, as seen in Fig. 4.

What I claim, and desire to secure by Letters Patent, is—

1. An expansible bolt device comprising a tube composed of semitubular shells, a wedging-nut longitudinally movable therein, one of said semitubular shells having a flexible tongue at one end to engage the other shell to hold the two together, and a transversely-extending flange at the other end of said tube to secure said nut within said tube, and a bolt to engage the said nut, substantially as described.

2. An expansible bolt device comprising a tube composed of semitubular parts, a portion of said parts being made thin and flexible and having outwardly-projecting spurs and an internally-threaded wedge-nut adapted to be engaged by a screw-bolt to operate said nut to expand said thin portion and spurs outwardly, substantially as described.

3. An expansible bolt device comprising a tube with a portion between its ends made thin and flexible and provided with outward projections, an internally-threaded wedge-nut within said tube, and a screw-bolt to engage said wedge-nut to expand said thin portion and spurs outwardly, substantially as described.

In testimony whereof I affix my signature in presence of two witnesses.

WILLIAM RAYMOND KINNEAR.

Witnesses:
MERRILL U. RICKETTS,
GEORGE M. FINCKEL.